No. 624,614. Patented May 9, 1899.
J. A. BEVINGTON.
EDUCATIONAL DEVICE.
(Application filed Mar. 31, 1898.)
(No Model.)

Witnesses
Inventor
John A. Bevington,

UNITED STATES PATENT OFFICE.

JOHN A. BEVINGTON, OF ESCONDIDO, CALIFORNIA, ASSIGNOR OF ONE-FOURTH TO CHARLES G. WITT, OF POWAY, CALIFORNIA.

EDUCATIONAL DEVICE.

SPECIFICATION forming part of Letters Patent No. 624,614, dated May 9, 1899.

Application filed March 31, 1898. Serial No. 675,912. (No model.)

*To all whom it may concern:*

Be it known that I, JOHN A. BEVINGTON, a citizen of the United States, residing at Escondido, in the county of San Diego and State of California, have invented a new and useful Educational Device, of which the following is a specification.

My invention relates to educational devices, and more especially to devices for indicating the difference in time between different places on the surface of the earth.

The object of my invention is to furnish for the use of schools especially and the public in general a simple and cheap device intended to more particularly illustrate to the student the reasons for certain mathematical operations connected with "longitude and time," that he may have a clearer conception thereof, and to aid him in ever having a clearer and better idea of the subject of longitude and time.

With this object in view my invention consists in a device for this purpose comprising an oblong card or board which may or may not be provided with a representation of the sun, a dial-plate pivotally secured on the surface of the card or board, having drawn, printed, or painted thereon a representation of the northern or southern hemisphere, the lines indicating the degrees of longitude radiating from the center of the dial and those indicating degrees of latitude appearing thereon in concentric circles, all the lines of longitude and latitude being properly marked with numerals and letters, there being also three concentric circles drawn upon the card or board outside of and immediately adjacent to the periphery of the dial, the inner circle being divided into twenty-four sections, indicating the twenty-four hours of the day, and marked from "I" to "XII" on each side to indicate the hours from noon to midnight and from midnight to noon, the middle circle being marked "MD" to indicate midday and "MN" to indicate midnight, the intermediate spaces on one side being marked "PM" to indicate postmeridian or afternoon and on the other side "AM" to indicate antemeridian or forenoon, and the outer circle being marked with the numerals from "1" to "24" to indicate the hours from midnight to midnight of one day.

In order to enable others skilled in the art to which my invention most nearly appertains to make and use the same, I will now proceed to describe its construction and operation, reference being had to the accompanying drawings, forming part of this specification, in which—

Figure 1:
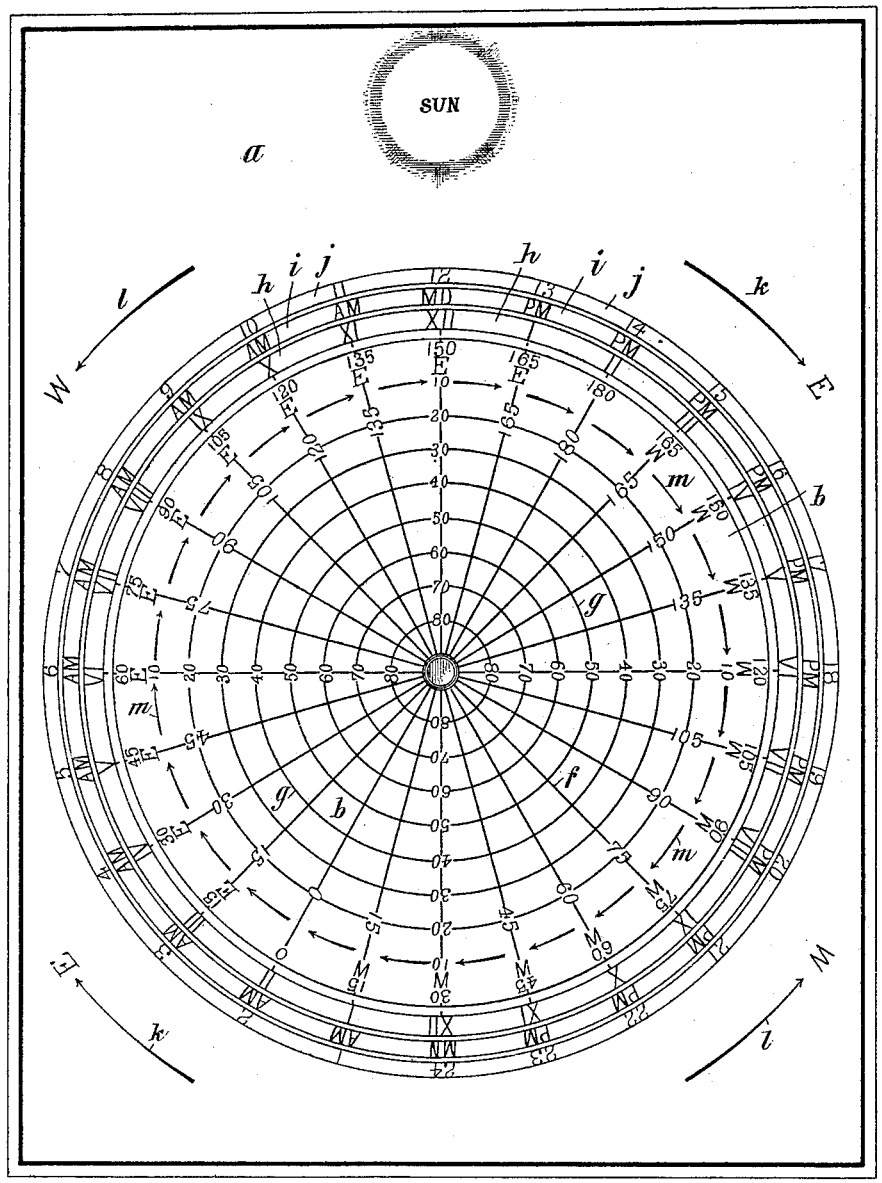
Figure 2:
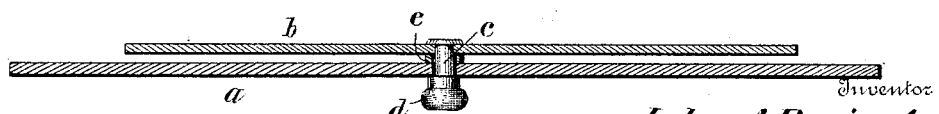

Figure 1 is a plan view illustrating my invention. Fig. 2 is a transverse section through the same.

Like letters of reference mark the same parts wherever they occur in the various parts of the drawings.

Referring to the drawings by letters, $a$ indicates an oblong sheet of cardboard or thin wood, upon the upper central portion of which is drawn, printed, or painted a representation of the sun.

$b$ indicates a dial or circular disk of the same or any other suitable material secured to a spindle $c$, which is passed through an opening in the center of the cardboard $a$ and provided on the end thereof with a knob $d$, which serves to hold the card and dial pivotally to each other, a separating-washer $e$ being placed upon the spindle between the card and the dial to hold the dial off the card and prevent friction. Upon the dial is drawn, printed, or painted a representation of either the northern or the southern hemisphere, the lines $f$ radiating from the center representing lines of longitude east and west of Greenwich, each line being marked with numerals to indicate the number of degrees it represents and either the letter "E" or "W" to indicate east or west of Greenwich. Although I have not so indicated in the drawings, in practice the dial will be marked with the outline of the different divisions of land and water, the principal countries, and more especially the principal cities, being clearly indicated. The concentric circles (marked $g$) indicate parallels of latitude and are properly marked with numerals to indicate the number of degrees from the equator.

Around the outer line or circumference of the disk or dial $b$ six concentric circles are drawn upon the card or board, inclosing three concentric annular spaces $h$, $i$, and $j$, each of which is divided into twenty-four sections, the sections of the interior annular space being marked with Roman numerals from "I" to "XII," indicating the hours from midnight to midday, and from "I" to "XII," indicating the hours from midday to midnight, the sections of the middle annular space being marked "MD" at the top to indicate midday and "MN" at the bottom to indicate midnight, the sections on one side being marked "PM" to indicate postmeridian or afternoon and those on the other side being marked "AM" indicating antemeridian or forenoon, and the sections in the exterior or outer annular space being marked with numerals from "1" to "24" to indicate the hours from midnight to midnight. Arrows $k$ $k$ and $l$ $l$ on the card outside of the circles, pointing to the letters "E" or "W," indicate the direction of motion of the earth. Inasmuch, however, as the card which represents the earth is intended to be stationary, the change of relation in the positions of the card and dial is effected by rotating the dial in the opposite directions.

In operating my invention, supposing that it be required to ascertain the difference in time between a point, say, fifteen degrees west of Greenwich and a second point one hundred and fifty degrees east of Greenwich and that the time of observation is twelve o'clock noon, let the dial be turned by means of the knob $d$ on the end of the spindle until the line of longitude marked "E 150" is brought to register with the characters "XII," "MD," "12" in the three concentric annular spaces $h$, $i$, and $j$ on the card. It will be observed that the line or meridian of longitude marked "W 15" will now be brought into register with the characters "I," "AM," and "1" on the three concentric annular spaces $h$, $i$, and $j$, which will indicate that when it is twelve o'clock noon at the point one hundred and fifty degrees east of Greenwich it is one o'clock a. m. at a point fifteen degrees west of Greenwich, thus indicating a difference of eleven hours between the two points.

The direction in which the dial or disk is to be turned is indicated on the dial by arrows $m$.

The advantages attending the use of my invention will be obvious from the foregoing description taken in connection with the illustration. By its use the location of the different countries and places of interest will be apparent to the student, and the manipulation of the device not only being unaccompanied by any difficult mathematical demonstration, but rendering all such demonstrations unnecessary, will be entertaining and pleasant to the student, both instructing and amusing him. The card may be made reversible, with the northern hemisphere on one side and the southern on the other, and the knob may be either in front or rear of the card.

Having thus fully described my invention, what I claim as new, and desire to secure by Letters Patent of the United States, is—

An educational device, consisting of a card containing a representation of the sun and a dial pivotally secured to the card by means of a spindle attached to the dial, projecting through the card and provided in the rear of the card with a knob for turning the dial and a spacing-disk between the said card and dial, the dial containing a representation of the northern or southern hemisphere, the lines indicating the degrees of longitude radiating from the center of the dial and those indicating degrees of latitude appearing thereon in concentric circles, all the lines of longitude and latitude being properly marked with numerals and letters, there being also three concentric circles drawn upon the card or board, outside of and immediately adjacent to the periphery of the dial, the inner circle being divided into twenty-four sections, indicating the twenty-four hours of the day and marked from "I" to "XII" on each side to indicate the hours from noon to midnight and from midnight to noon, the middle circle being marked "MD" to indicate midday and "MN" to indicate midnight, the intermediate spaces on one side being marked "PM" to indicate postmeridian or afternoon and on the other side "AM" to indicate antemeridian or forenoon, and the outer circle being marked with the numerals from "1" to "24" to indicate the hours from midnight to midnight of one day.

JOHN A. BEVINGTON.

Witnesses:
  S. S. ROGERS,
  L. W. BURGESS.